(12) United States Patent
Seo et al.

(10) Patent No.: US 8,941,781 B2
(45) Date of Patent: Jan. 27, 2015

(54) PROJECTOR, APPARATUS AND METHOD FOR DRIVING OPTICAL SCANNER THEREOF

(71) Applicant: LG Electronics Inc., Seoul (KR)

(72) Inventors: Junghoon Seo, Seoul (KR); Junghwan Choi, Seoul (KR); Yongki Kim, Seoul (KR); Jaewook Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/733,967

(22) Filed: Jan. 4, 2013

(65) Prior Publication Data

US 2013/0176490 A1  Jul. 11, 2013

(30) Foreign Application Priority Data

Jan. 5, 2012 (KR) .................. 10-2012-0001712

(51) Int. Cl.
*H04N 5/10* (2006.01)
*H04N 5/257* (2006.01)
*G09G 5/10* (2006.01)
*G09G 5/00* (2006.01)
*G06K 9/40* (2006.01)
*H04N 5/08* (2006.01)
*G09G 3/34* (2006.01)
*G09G 3/00* (2006.01)
*G09G 3/02* (2006.01)

(52) U.S. Cl.
CPC ............. *H04N 5/08* (2013.01); *G09G 3/346* (2013.01); *G09G 3/002* (2013.01); *G09G 3/025* (2013.01)
USPC ............. 348/530; 348/108; 345/690; 345/7; 382/254

(58) Field of Classification Search
None
See application file for complete search history.

(56) References Cited

U.S. PATENT DOCUMENTS

2002/0050956 A1\* 5/2002 Gerhard et al. .............. 345/7
2003/0058190 A1\* 3/2003 Lewis et al. ................ 345/7
2006/0072843 A1\* 4/2006 Johnston .................. 382/254

(Continued)

FOREIGN PATENT DOCUMENTS

JP        2009-198988 A    9/2009
WO    WO 2008/038676 A1  4/2008
WO    WO 2010/107071 A1  9/2010

OTHER PUBLICATIONS

Karki, Jim: "Fully differential amplifiers remove noise from common-mode signals"; Texas Instruments; Nov. 9, 2000; Retrieved from Internet: URL http://wdv.com/Electronics/Reference/pdfs/DifferentialAmplifiers.pdf (XP002694015).

(Continued)

*Primary Examiner* — Jefferey Harold
*Assistant Examiner* — Sean Haiem
(74) *Attorney, Agent, or Firm* — KED & Associates LLP

(57) ABSTRACT

A projector and an apparatus and method for driving an optical scanner are disclosed. A sensing signal processor receives a sensing signal that represents sensing of operation of the optical scanner and generates a horizontal scan signal corresponding to a horizontal frequency of the optical scanner on the basis of the received sensing signal. A driving signal generator generates at least one of a horizontal reference signal including line information that indicates the number of horizontal lines of a horizontal driving signal of the optical scanner, a reference clock signal and a scanner driving signal for driving the optical scanner on the basis of the generated horizontal scan signal.

19 Claims, 10 Drawing Sheets

(56) References Cited

U.S. PATENT DOCUMENTS

| | | | |
|---|---|---|---|
| 2007/0076092 A1* | 4/2007 | Yeo et al. | 348/108 |
| 2012/0001961 A1* | 1/2012 | Nishikawa et al. | 345/690 |
| 2012/0120116 A1* | 5/2012 | Seo et al. | 345/690 |

OTHER PUBLICATIONS

European Search Report dated Apr. 3, 2013 issued in Application No. 13 00 0029.2.

* cited by examiner

N line

N line

N-1 line

N+1 line

PROJECTOR, APPARATUS AND METHOD FOR DRIVING OPTICAL SCANNER THEREOF

CROSS REFERENCE TO RELATED APPLICATION

This application claims priority under 35 U.S.C. §119 to Korean Application No. 10-2012-0001712, filed in Korea on Jan. 5, 2012 which is hereby incorporated in its entirety by reference as if fully set forth herein.

BACKGROUND OF THE INVENTION

1. Field of the Invention

The present invention relates to a projector, and more particularly, to a projector and an apparatus and method for driving an optical scanner of the projector, which can improve system stabilization and synchronization of video data and audio data.

2. Discussion of the Related Art

Rapid progress in multimedia requires a large display screen and high definition. Recently, representation of natural colors is considered important in addition to high resolution.

It is necessary to use a light source having high color purity, such as a laser, to achieve perfect natural colors. One of devices generating images using a laser is a projector using an optical scanner. The projector scans a screen with a beam generated from a laser source using the optical scanner to form an image on the screen.

To generate a high-definition image, the optical scanner needs to operate at a high driving speed. A driving angle of the optical scanner increases when a driving signal has a specific frequency. A specific frequency of the driving signal, which increases the driving angle of the optical scanner, is called a resonance frequency. Accordingly, the driving angle reaches a maximum level and the optical scanner can be driven at a high speed when the driving signal corresponds to the resonance frequency.

However, since the resonance frequency varies due to process variation in the manufacture of the optical scanner, it is very difficult to generate a driving signal corresponding to the resonance frequency. The resonance frequency of the optical scanner may vary depending on the intensity of light input to the optical scanner in addition to process variation. That is, since the intensity of light input to the optical scanner is not uniform, the temperature of the optical scanner varies with time, and thus the resonance frequency of the optical scanner also varies with time.

Due to this varying resonance frequency, the optical scanner does not operate in response to vertical and horizontal driving signals input thereto, generating a driving error. The driving error of the optical scanner causes parts of left and right sides or parts of the top and bottom of a displayed image to be switched each other and decreases the size of the displayed image.

SUMMARY OF THE INVENTION

Accordingly, the present invention is directed to a projector and an apparatus and method for driving an optical scanner of the projector that substantially obviates one or more problems due to limitations and disadvantages of the related art.

An object of the present invention is to provide a projector and an apparatus and method for driving an optical scanner of the projector, which can drive the optical scanner in synchronization with a vertical synchronization signal of video data input to the projector.

Another object of the present invention is to provide a projector and an apparatus and method for driving an optical scanner of the projector, which can drive the optical scanner while maintaining a horizontal frequency of the optical scanner uniform and locking a vertical frequency of the optical scanner to a vertical synchronization signal of video data input to the projector.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a projector includes a video processor for receiving video data and a vertical synchronization signal of the video data, and a scanner driver for controlling the number of horizontal lines of a horizontal driving signal of the optical scanner to be varied on the basis of the received vertical synchronization signal.

The scanner driver may generate a horizontal scan signal on the basis of a sensing signal received from the optical scanner and generate at least one of a horizontal reference signal including line information that indicates the number of horizontal lines of the horizontal driving signal of the optical scanner, a reference clock signal and a scanner driving signal for driving the optical scanner on the basis of the generated horizontal scan signal.

The video processor may generate a read enable signal for controlling output timing of the received video data on the basis of the horizontal reference signal.

The projector may further include a laser source for emitting a beam for displaying the video data, and a laser driver for generating a laser driving signal for driving the laser source on the basis of the video data output according to the read enable signal and the generated reference clock signal.

The video processor may include an adjustor for generating the read enable signal on the basis of the generated horizontal reference signal, and a memory controller for controlling the video data to be output to the laser driver according to the read enable signal.

The video processor may buffer the video data as data having a size of less than one video frame.

The scanner driver may control the number of horizontal lines corresponding to a return period of the optical scanner to be maintained as an odd number or an even number.

In another aspect of the present invention, an apparatus for driving an optical scanner includes a sensing signal processor for receiving a sensing signal that represents sensing of operation of the optical scanner and generating a horizontal scan signal corresponding to a horizontal frequency of the optical scanner on the basis of the received sensing signal, and a driving signal generator for generating at least one of a horizontal reference signal including line information that indicates the number of horizontal lines of a horizontal driving signal of the optical scanner, a reference clock signal and a scanner driving signal for driving the optical scanner on the basis of the generated horizontal scan signal.

The optical scanner may scan the number of horizontal lines, indicated by the line information.

The number of horizontal lines of the horizontal driving signal of the optical scanner may vary.

The apparatus may further include an adjustor for generating a read enable signal for controlling output timing of received video data on the basis of the generated horizontal reference signal.

In another aspect of the present invention, a method for driving an optical scanner includes sensing operation of the optical scanner, a generating a horizontal scan signal corresponding to a horizontal frequency of the optical scanner on the basis of a sensing signal that represents sensing of operation of the optical scanner, and generating at least one of a horizontal reference signal including line information that indicates the number of horizontal lines of a horizontal driving signal of the optical scanner, a reference clock signal and a scanner driving signal for driving the optical scanner on the basis of the generated horizontal scan signal.

The method may further include generating a read enable signal for controlling output timing of video data on the basis of the generated horizontal reference signal.

The generating of the horizontal scan signal may include removing noise from the sensing signal, and converting the noise-removed sensing signal into a clock signal.

The method may further include the optical scanner scanning the number of horizontal lines, indicated by the line information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
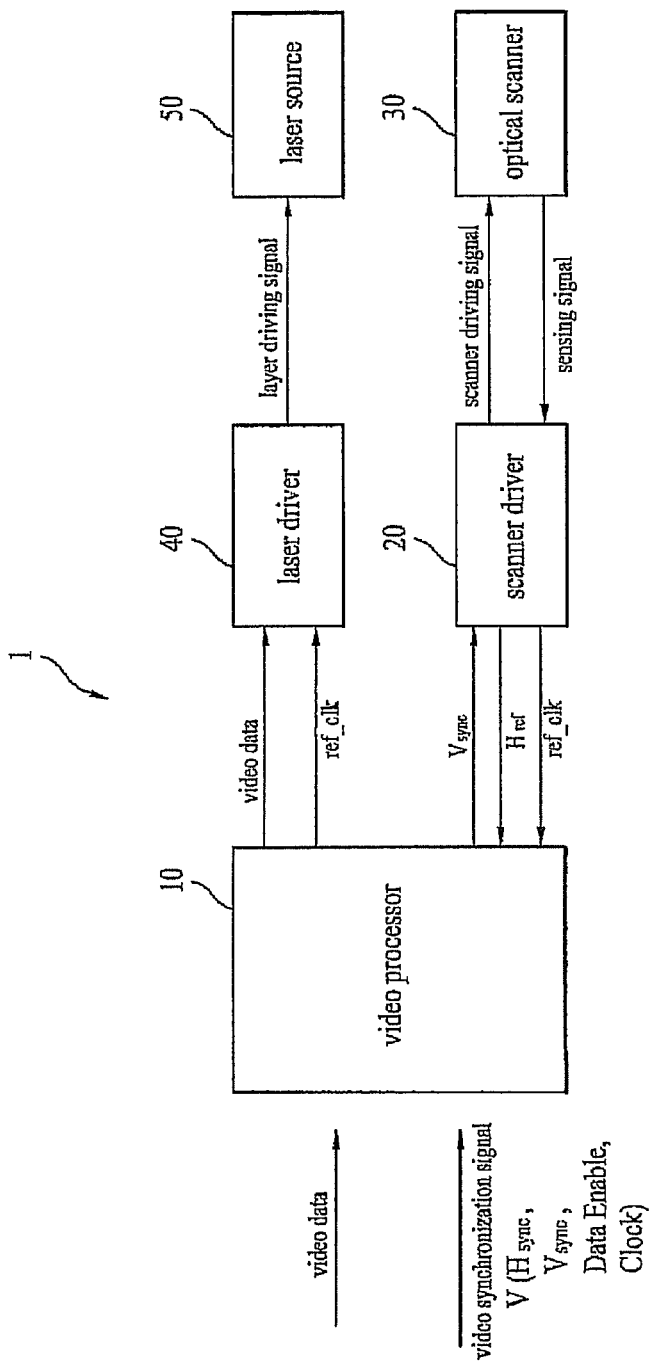
FIG. 1 is a block diagram of a projector according to an exemplary embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

In the following description of the embodiments, it will be understood that, when an element such as a layer (film), region, pattern, or structure is referred to as being "on" or "under" another element, it can be "directly" on or under another element or can be "indirectly" formed such that an intervening element is also present. Also, terms such as "on" or "under" should be understood on the basis of the drawings.

In the drawings, dimensions of layers are exaggerated, omitted or schematically illustrated for clarity and convenience of description. In addition, dimensions of constituent elements do not entirely reflect actual dimensions thereof.

FIG. 1 is a block diagram of a projector 1 according to an exemplary embodiment of the present invention.

Referring to FIG. 1, the projector 1 may include a video processor 10, a scanner driver 20, an optical scanner 30, a laser driver 40, and a laser source 50.

The video processor 10 receives video data and a video synchronization signal. The video synchronization signal may include at least one of a vertical synchronization signal Vsync, an input horizontal synchronization signal Hsync, a data enable signal Data Enable, and a clock signal Clock.

The video processor 10 can output the vertical synchronization signal Vsync to the scanner driver 20. The video processor 10 can receive a horizontal reference signal Href from the scanner driver 20 and control output timing of the video data on the basis of the received horizontal reference signal Href. That is, the video processor 10 can control output of the video data to the laser driver 40 on the basis of the horizontal reference signal Href.

The video processor 10 can output the received video data to the laser driver 40. In an exemplary embodiment, the video processor 10 can process the received video data such that the video data corresponds to the format of a video to be projected and output the processed video data to the laser driver 40. In an exemplary embodiment, the video processor 10 can perform noise removal, picture quality correction and gamma correction on the received video data and output the corrected video data to the laser driver 40.

In addition, the video processor 10 can receive a reference clock signal ref_clk from the scanner driver 20 and output the received reference clock signal ref_clk to the laser driver 40.

The scanner driver 20 receives the vertical synchronization signal Vsync from the video processor 10. The scanner driver 20 controls the number of horizontal lines scanned by the optical scanner 30 to be varied on the basis of the received vertical synchronization signal Vsync. Here, the number of horizontal lines scanned by the optical scanner may refer to the number of horizontal lines of a horizontal driving signal of the optical scanner 30.

The scanner driver 20 can determine line information that indicates the number of horizontal lines of the horizontal driving signal of the optical scanner 30 and generate the horizontal reference signal Href including the determined line information. In an exemplary embodiment, the scanner driver 20 can receive a sensing signal that represents sensing of operation of the optical scanner 30 from the optical scanner 30 and generate a horizontal scan signal corresponding to a horizontal frequency of the optical scanner on the basis of the received sensing signal. The scanner driver 20 can generate the horizontal reference signal Href including the line information on the basis of at least one of the vertical synchronization signal Vsync and the horizontal scan signal. In addition, the scanner driver 20 can output the generated horizontal reference signal Href to the video processor 10.

Furthermore, the scanner driver 20 can generate the reference clock signal ref_clk on the basis of at least one of the vertical synchronization signal Vsync and the horizontal scan signal and output the generated reference clock signal ref_clk to the video processor 10.

The scanner driver 20 can control the number of horizontal lines scanned by the optical scanner 30 to be varied on the basis of at least one of the vertical synchronization signal Vsync and the horizontal scan signal. The scanner driver 20 can generate a scanner driving signal for controlling the optical scanner 30 on the basis of at least one of the vertical synchronization signal Vsync and the horizontal scan signal. Here, the scanner driving signal may include a vertical driving signal and a horizontal driving signal.

The scanner driver 20 can generate the scanner driving signal on the basis of the vertical synchronization signal Vsync in an initial stage. The scanner driver 20 can generate the scanner driving signal on the basis of at least one of the vertical synchronization signal Vsync and the horizontal scan signal in a feedback stage. Here, the feedback stage refers to a stage after the initial stage. The scanner driving signal generated in the feedback stage is referred to as a feedback scanner driving signal hereinafter.

The optical scanner 30 is driven under control of the scanner driver 20 and scans a screen with a beam emitted from the laser source 50. The optical scanner 30 can be driven according to the scanner driving signal generated by the scanner driver 20. In an exemplary embodiment, the optical scanner 30 may be a MEMS (micro-electro-mechanical system) scanner.

The optical scanner 30 can sense operation thereof and output the sensing signal indicating operation thereof to the scanner driver 20.

The laser driver 40 receives the video data and the reference clock signal ref_clk from the video processor 10 and controls the laser source 50 to project a beam for displaying the received video data. The laser driver 40 can generate a laser driving signal for controlling the laser source 50 on the basis of at least one of the received video data and the reference clock signal ref_clk. Here, the received video data may be output according to output timing controlled on the basis of the horizontal reference signal Href.

The laser source 50 projects the beam for displaying the video data under the control of the laser driver 40. The laser source 50 can be driven according to the laser driving signal generated by the laser driver 40.

Figure 2:
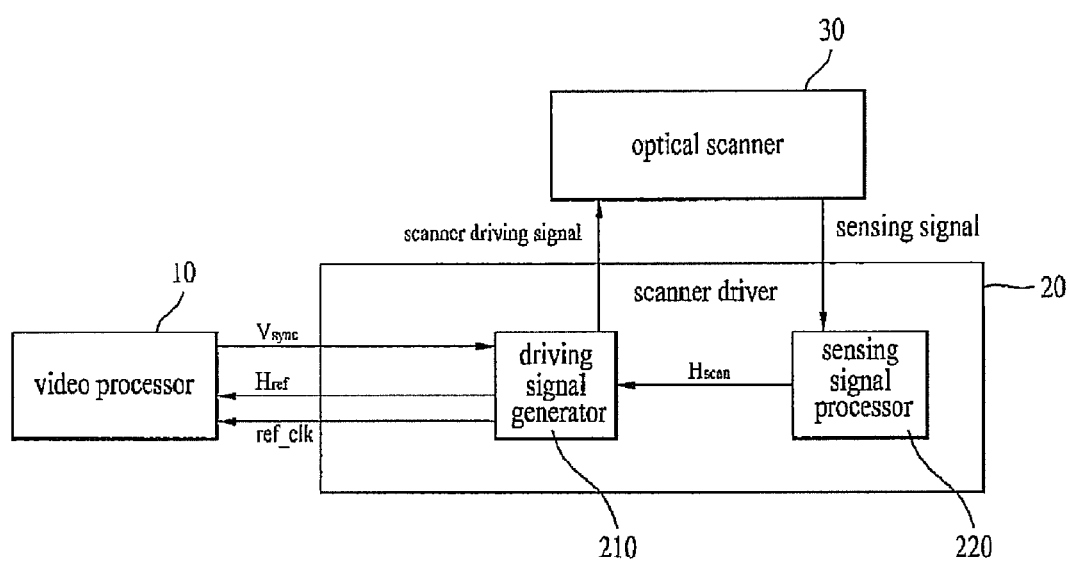
FIG. 2 is a block diagram of a scanner driver according to an exemplary embodiment of the present invention.

FIG. 2 is a block diagram of the scanner driver according to an exemplary embodiment of the present invention.

Referring to FIG. 2, the scanner driver 20 may include a driving signal generator 210 and a sensing signal processor 220.

The driving signal generator 210 generates an initial scanner driving signal on the basis of the vertical synchronization signal Vsync received from the video processor 10 and outputs the generated initial scanner driving signal to the optical scanner 30. The driving signal generator 210 can generate the feedback scanner driving signal on the basis of at least one of the vertical synchronization signal Vsync and a horizontal scan signal Hscan generated by the sensing signal processor 220 and output the feedback scanner driving signal to the optical scanner 30. Here, the number of horizontal lines scanned by the optical scanner 30 according to the initial scanner driving signal may differ from the number of horizontal lines scanned by the optical scanner 30 according to the feedback scanner driving signal. Furthermore, the number of horizontal lines scanned by the optical scanner 30 may vary with the feedback scanner driving signal.

The driving signal generator 210 may include a memory, a digital-to-analog converter, a filter, and a frequency controller, which are not shown.

The memory is a look-up table and may include a first memory storing a horizontal synchronization signal for driving the optical scanner 30 and a second memory storing a vertical synchronization signal for driving the optical scanner 30.

The digital-to-analog converter may include a first digital-to-analog converter for converting the horizontal synchronization signal stored in the first memory into an analog signal and a second digital-to-analog converter for converting the vertical synchronization signal stored in the second memory into an analog signal.

The filter is a low pass filter including a first filter and a second filter. The filter filters a high-frequency component of an analog signal to generate a driving signal.

That is, the filter can include the first filter for filtering a high-frequency component of the horizontal synchronization signal and the second filter for filtering a high-frequency component of the vertical synchronization signal.

The frequency controller can control frequency amplification of the synchronization signals stored in the memory according to a control signal.

The sensing signal processor 220 generates the horizontal scan signal Hscan corresponding to the horizontal frequency of the optical scanner 30 on the basis of the sensing signal output from the optical scanner 30. The sensing signal processor 220 can perform signal processing on the sensing signal to generate the horizontal scan signal. As an example of signal processing, the sensing signal processor 220 can remove noise from the received sensing signal and perform zero-crossing on the noise-removed sensing signal to convert the clock signal. In an exemplary embodiment, the sensing signal processor 220 can differentially amplify the sensing signal through a differential amplifier included therein to remove noise and adjust offset of the differential-amplified signal during the noise removal process.

The driving signal generator 210 can generate the horizontal reference signal Href including the line information that indicates the number of horizontal lines of the horizontal driving signal of the optical scanner 30 on the basis of at least one of the vertical synchronization signal Vsync and the horizontal scan signal output from the sensing signal processor 220. The optical scanner 30 can scan as many horizontal lines as the number of horizontal lines, indicated by the line information.

An optical scanner driving apparatus according to an embodiment of the present invention may include the driving signal generator 210 and the sensing signal processor 220. In an exemplary embodiment, the optical scanner driving apparatus may further include the optical scanner 30. The optical scanner driving apparatus may be a component of the projector.

Figure 3:
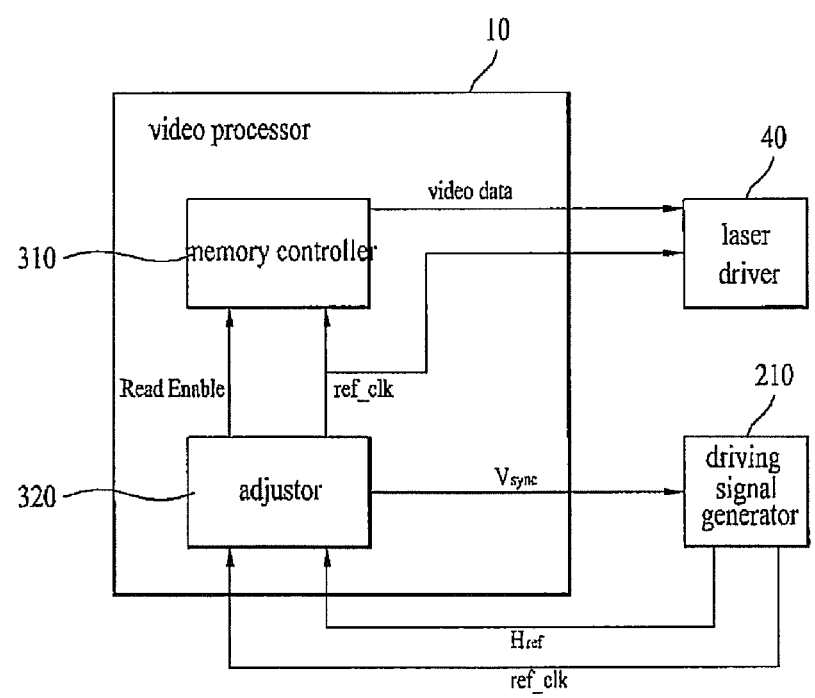
FIG. 3 is a block diagram of a video processor according to an exemplary embodiment of the present invention.

FIG. 3 is a block diagram of the video processor according to an exemplary embodiment of the present invention.

Referring to FIG. 3, the video processor 10 may include a memory controller 310 and an adjuster 320. In an exemplary embodiment, the video processor 310 may further include a memory (not shown) for receiving a video frame applied to the video processor 310.

The memory controller 310 can buffer received video data. The memory controller 310 can buffer the received video data as data having a size smaller than one video frame. In an exemplary embodiment, the memory controller 310 may include a memory (not shown). The memory (not shown) can have a smaller capacity than one video frame.

Since the projector 1 according to the present invention drives the optical scanner 30 in synchronization with the input vertical synchronization signal Vsync, an input vertical frequency and an output vertical frequency of video data correspond to each other. Accordingly, there is no need to perform buffering of video frames, which is necessary when there is a difference between the input vertical frequency and the output vertical frequency of the video data. Therefore, the projector according to the present invention requires memory capacity of less than one video frame for storing video data.

The memory controller 310 can control output timing of the video data on the basis of a read enable signal output from the adjustor 320. That is, the memory controller 310 controls output of the video data to the laser driver 40 on the basis of the read enable signal.

The adjustor 320 generates the read enable signal on the basis of the horizontal reference signal Href output from the driving signal generator 210 and outputs the generated read enable signal to the memory controller 310. Here, the adjustor 320 can generate a read enable signal for controlling output timing of the video data such that one video frame is scanned with as many horizontal lines as the number of lines indicated by the line information included in the horizontal reference signal Href.

In an exemplary embodiment, the optical scanner driving apparatus according to the present invention may further include the adjustor 320. The optical scanner driving apparatus according to the present invention may be a projector.

Figure 4:
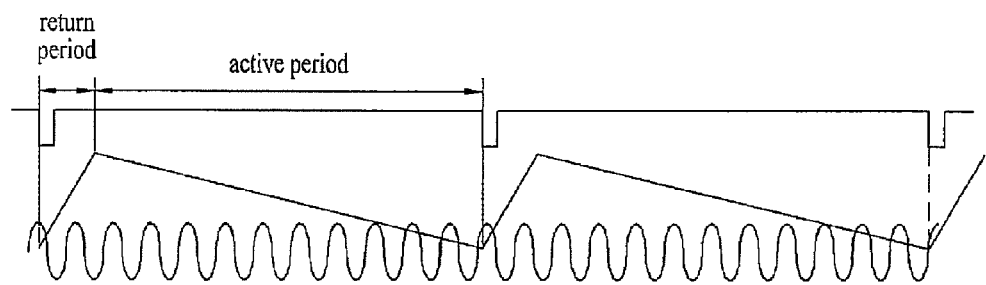
FIG. 4 illustrates synchronization of horizontal and vertical frequencies of the optical scanner.

FIG. 4 illustrates synchronization of horizontal and vertical frequencies of the optical scanner.

Referring to FIG. 4, the vertical synchronization signal of the optical scanner may not be uniform according to a variable horizontal resonance frequency. Accordingly, it is necessary for a conventional projector to vary a vertical synchronization signal applied thereto such that the vertical synchronization signal is synchronized with a horizontal synchronization signal having a variable frequency. For example, when the frequency of an active period of the horizontal synchronization signal increases since the horizontal synchronization signal is varied, an active period of the vertical synchronization signal needs to be increased such that the active period of the vertical synchronization signal is synchronized with the active period of the horizontal synchronization signal. The active period of the horizontal synchronization signal refers to a time in which a vertical synchronization signal for one video frame falls from high to low and a return period of the horizontal synchronization signal refers to a time in which the vertical synchronization signal for one video frame rises from low to high.

When the vertical synchronization signal varies with the variable horizontal synchronization signal, a video frame may be lost or two images may present in one frame. Furthermore, a variable frequency of the vertical synchronization signal may cause video data and audio data not to be synchronized with each other.

Accordingly, the present invention locks the vertical synchronization signal to a specific level and changes the number of horizontal lines scanned by the optical scanner 30 to synchronize the vertical and horizontal synchronization signals with each other.

Figure 5:
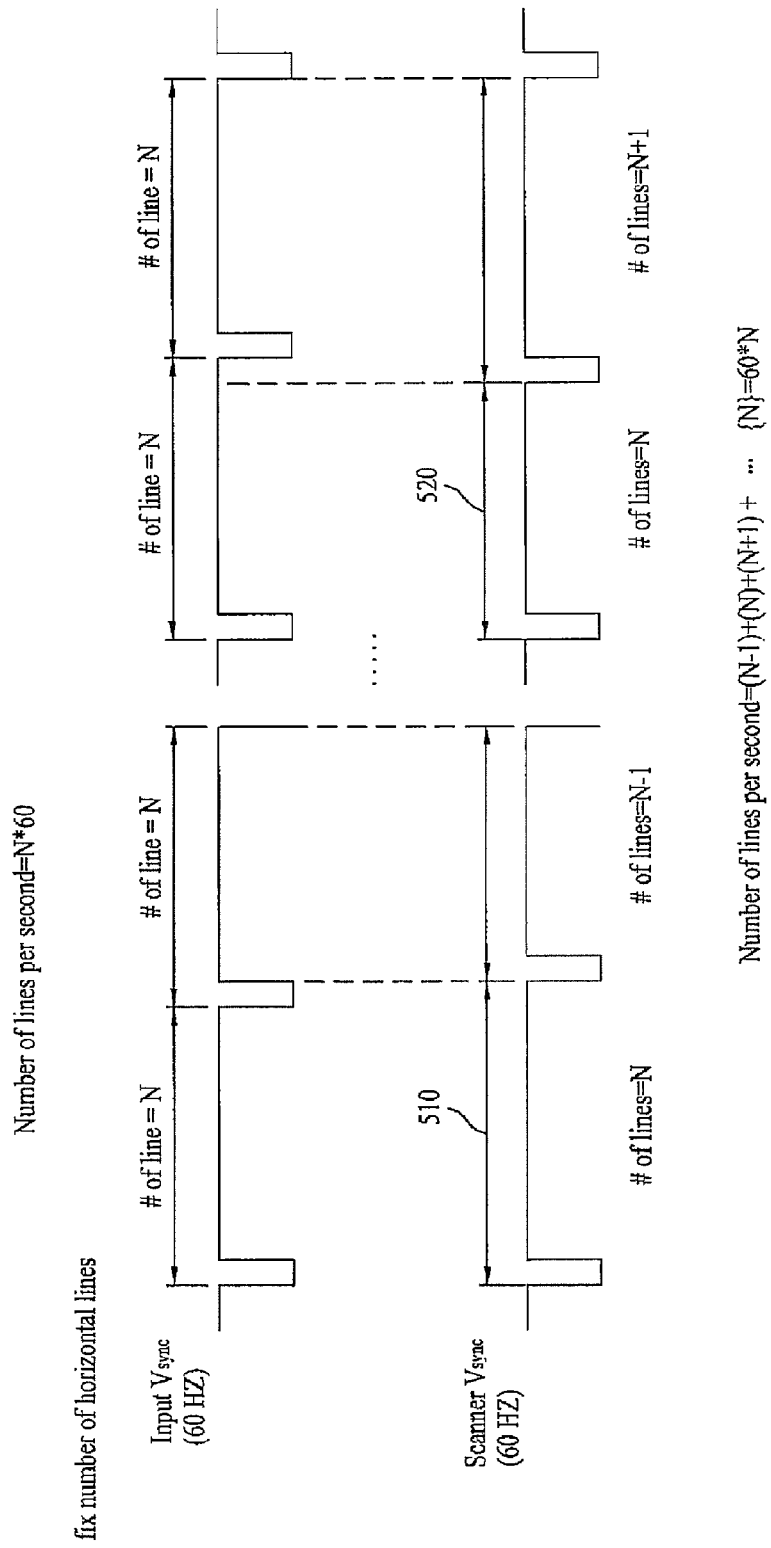
FIG. 5 illustrates a method of varying the number of horizontal lines scanned by the optical signal according to an exemplary embodiment of the present invention.

FIG. 5 illustrates a method of varying the number of horizontal lines scanned by the optical signal according to an exemplary embodiment of the present invention.

In FIG. 5, it is assumed that an input vertical synchronization signal InputVsync is 60 Hz, an input horizontal synchronization signal is 18 KHz, and the number of horizontal lines necessary to scan one screen is N. That is, N represents the number of horizontal lines scanned according to the input horizontal synchronization signal included in the video synchronization signal input to the video processor 10. Accordingly, the number of horizontal lines per second is N*60.

The projector 1 locks the output vertical synchronization signal to 60 Hz corresponding to the input vertical synchronization signal. Since the scanner vertical frequency Scanner Vsync decreases when the horizontal scan signal decreases from 18 KHz to 17 KHz (510), the scanner driver 20 reduces the number of horizontal lines scanned by the optical scanner 30. For example, the number of horizontal lines scanned by the optical scanner 30 can be reduced to N−1.

Since the scanner vertical frequency Scanner Vsync increases when the horizontal scan signal increases from 18 KHz to 19 KHz (520), the scanner driver 20 increases the number of horizontal lines scanned by the optical scanner 30. For example, the number of horizontal lines scanned by the optical scanner 30 can be increased to N+1.

The present invention varies the number of horizontal lines of a feedback horizontal scan signal to maintain the scanner vertical frequency Scanner Vsync at the same level as the input vertical frequency. That is, the present invention can adjust the number of lines for a predetermined time (e.g. one second) at 60 Hz, n*60, to (N−1)+N+(N−1)+(N+1)...(N) by varying the number of lines for the predetermined time at 60 Hz, N*60, and the number of horizontal lines for each video frame.

Since lines added to or removed from the horizontal lines scanned by the optical scanner 30 correspond to a blank period, a displayed image is not affected even when the number of horizontal lines scanned by the optical scanner 30 is changed. Furthermore, the projector 1 can stably operate and can be prevented from being damaged due to artificial adjustment of the horizontal frequency of the optical scanner 30 because the horizontal frequency of the optical scanner 30 is not artificially changed.

Figure 6:
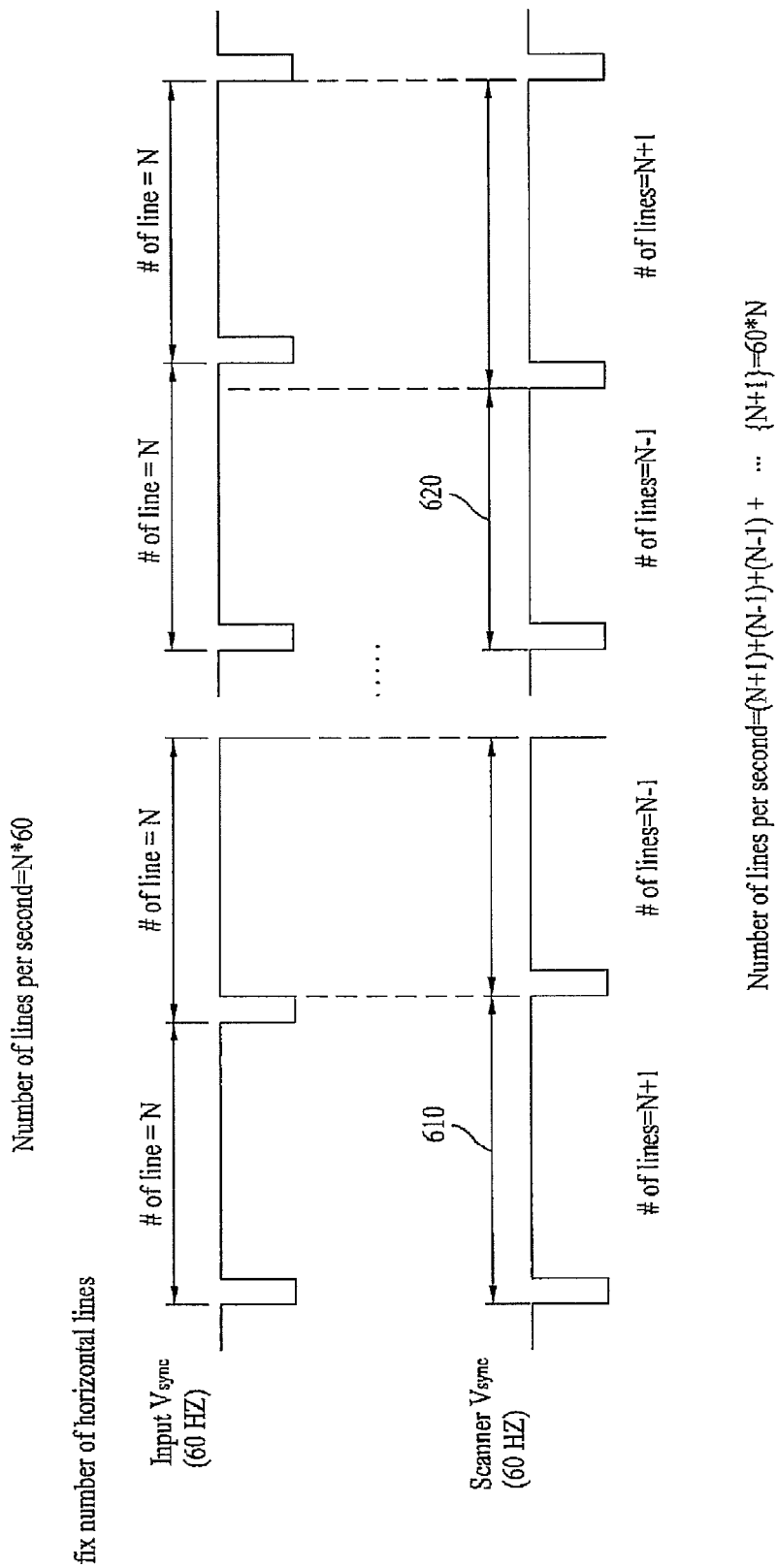
FIG. 6 illustrates a method of varying the number of horizontal lines scanned by the optical signal according to another exemplary embodiment of the present invention.

FIG. 6 illustrates a method of varying the number of horizontal lines scanned by the optical signal according to another exemplary embodiment of the present invention.

Referring to FIG. 6, when the horizontal scan signal decreases from 18 KHz to 17 KHz (610), the scanner vertical frequency Scanner Vsync decreases, and thus the scanner driver 20 reduces the number of horizontal lines scanned by the optical scanner 30. In an exemplary embodiment, the projector 1 reduces the number of horizontal lines scanned by the optical scanner 30 while maintaining the number of horizontal lines corresponding to a return period as an odd number. For example, the number of horizontal lines scanned by the optical scanner 30 can be reduced from N+1 to N−1.

In an exemplary embodiment, the projector 1 reduces the number of horizontal lines scanned by the optical scanner while maintaining the number of horizontal lines corresponding to a return period as an even number. For example, the number of horizontal lines scanned by the optical scanner 30 can be reduced from N+2 to N−2.

When the horizontal scan signal increases from 18 KHz to 19 KHz (620), the scanner vertical frequency Scanner Vsync increases, and thus the scanner driver 20 increases the number of horizontal lines scanned by the optical scanner 30. In an exemplary embodiment, the projector 1 increases the number of horizontal lines scanned by the optical scanner 30 while maintaining the number of horizontal lines corresponding to a return period as an odd number. For example, the number of horizontal lines scanned by the optical scanner 30 can be increased from N−1 to N+1.

In an exemplary embodiment, the projector 1 increases the number of horizontal lines scanned by the optical scanner 30 while maintaining the number of horizontal lines corresponding to a return period as an even number. For example, the number of horizontal lines scanned by the optical scanner 30 can be increased from N−2 to N+2.

To ensure that the scanner vertical frequency Scanner Vsync corresponds to the input vertical frequency, the present invention varies the number of horizontal lines of the horizontal scan signal corresponding to a return period while maintaining the number of horizontal lines as an odd number in an exemplary embodiment. That is, the present invention can adjust the number of lines for a predetermined time (e.g. one second) at 60 Hz, n*60, to (N−1)+N+(N−1)+(N+1) . . . (N) by varying the number of lines for the predetermined time, n*60, and the number of horizontal lines for each video frame. The projector 1 according to the present invention adjusts the number of horizontal lines corresponding to a return period of the optical scanner to an odd number, and thus it is possible to display an entire video frame without omitting horizontal lines of the video frame.

To ensure that the scanner vertical frequency Scanner Vsync corresponds to the input vertical frequency, the present invention varies the number of horizontal lines of the horizontal scan signal corresponding to a return period while maintaining the number of horizontal lines as an even number in an exemplary embodiment. That is, the present invention can adjust the number of lines for a predetermined time (e.g. one second) at 60 Hz, n*60, to (N+2)+(N−2)+(N+2) . . . (N−2) by varying the number of lines for the predetermined time, n*60, and the number of horizontal lines for each video frame.

Figure 7A:
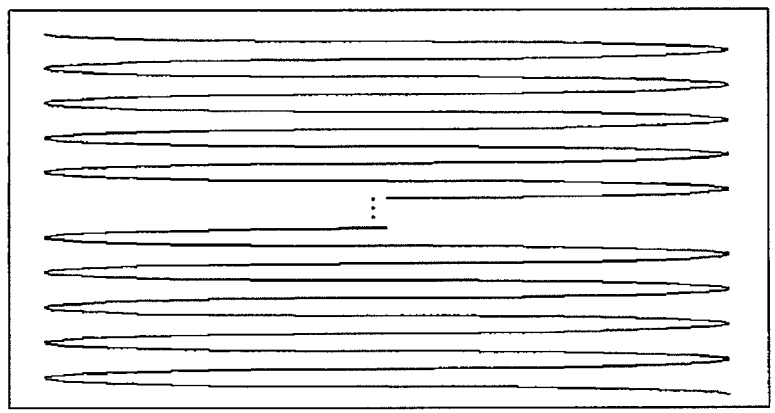
FIG. 7A illustrates a horizontal driving cycle of the optical scanner in an active period of a horizontal synchronization signal according to an exemplary embodiment of the present invention.
Figure 7B:
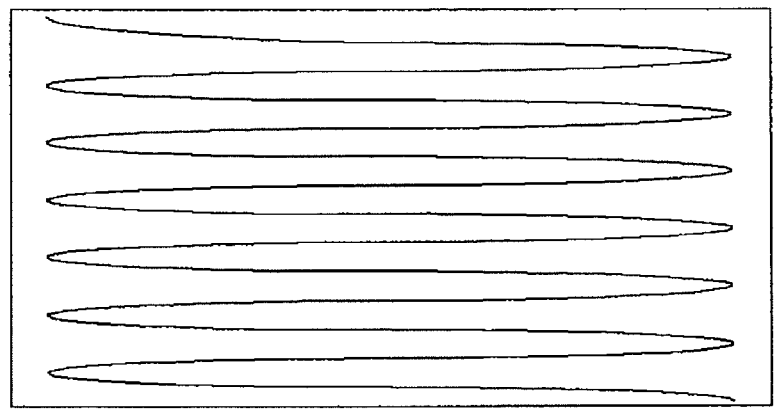
FIG. 7B illustrates a horizontal driving cycle of the optical scanner in a return period of the horizontal synchronization signal according to an exemplary embodiment of the present invention.
Figure 8:
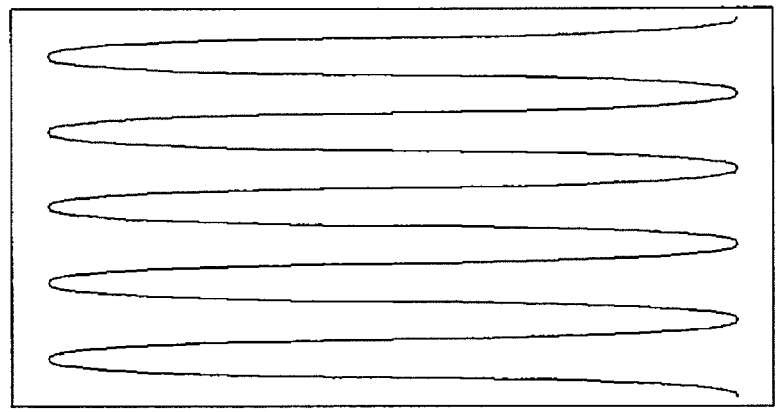
FIG. 8 illustrates a horizontal driving cycle of the optical scanner in a return period of the horizontal synchronization signal according to another exemplary embodiment of the present invention.
Figure 9:
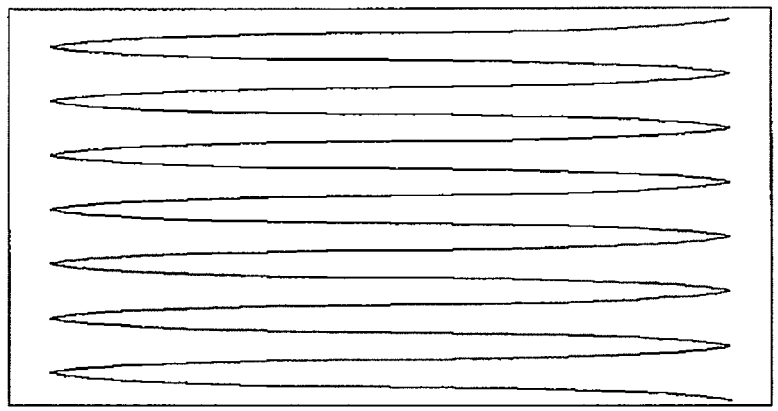
FIG. 9 illustrates a horizontal driving cycle of the optical scanner in a return period of the horizontal synchronization signal according to another exemplary embodiment of the present invention.

FIG. 7A illustrates a horizontal driving cycle of the optical scanner in an active period of the horizontal synchronization signal according to an exemplary embodiment of the present invention, FIG. 7B illustrates a horizontal driving cycle of the optical scanner in a return period of the horizontal synchronization signal according to an exemplary embodiment of the present invention. FIG. 8 illustrates a horizontal driving cycle of the optical scanner in a return period of the horizontal synchronization signal according to another exemplary embodiment of the present invention, and FIG. 9 illustrates a horizontal driving cycle of the optical scanner in a return period of the horizontal synchronization signal according to another exemplary embodiment of the present invention.

FIG. 7A shows a horizontal driving cycle of the optical scanner 30 in an active period of the horizontal synchronization signal when the optical scanner 30 scans N horizontal lines. Here, N represents horizontal lines scanned by the input horizontal synchronization signal.

FIG. 7B shows a horizontal driving cycle of the optical scanner 30 in a return period of the horizontal synchronization signal when the optical scanner 30 scans N horizontal lines.

FIG. 8 shows a horizontal driving cycle of the optical scanner 30 in a return period of the horizontal synchronization signal when the optical scanner 30 scans N−1 horizontal lines. The number of horizontal driving cycles of the optical scanner 30 in FIG. 8 is smaller than the number of horizontal driving cycles of the optical scanner 30 in FIG. 7B. While the optical scanner 30 returns to a left start point in FIG. 7B, the optical scanner 30 returns to a right start point since the number of horizontal lines corresponding to a return period is an odd number in FIG. 8. That is, the start point of the optical scanner 30 is switched to the left point and the right point whenever the optical scanner 30 scans a video frame. Accordingly, the projector 1 according to the present can display a video frame without damaging the video frame by scanning the video frame without omitting the first horizontal line.

FIG. 9 shows a horizontal driving cycle of the optical scanner 30 in a return period of the horizontal synchronization signal when the optical scanner 30 scans N+1 horizontal lines. The number of horizontal driving cycles of the optical scanner 30 in FIG. 9 is greater than the number of horizontal driving cycles of the optical scanner 30 in FIG. 8. While the optical scanner 30 returns to the left start point in FIG. 7B, the optical scanner 30 returns to the right start point since the number of horizontal lines corresponding to a return period is an odd number in FIG. 9. That is, the start point of the optical scanner 30 is switched to the left point and the right point whenever the optical scanner 30 scans a video frame. Accordingly, the projector 1 according to the present can display a video frame without damaging the video frame by scanning the video frame without omitting the first horizontal line.

Therefore, while the vertical synchronization signal varies since the horizontal driving cycle of the optical scanner is maintained in a conventional projector, the present invention can lock the vertical synchronization signal without changing the horizontal driving cycle of the optical scanner by varying the number of horizontal lines scanned by the optical scanner 30.

Figure 10:
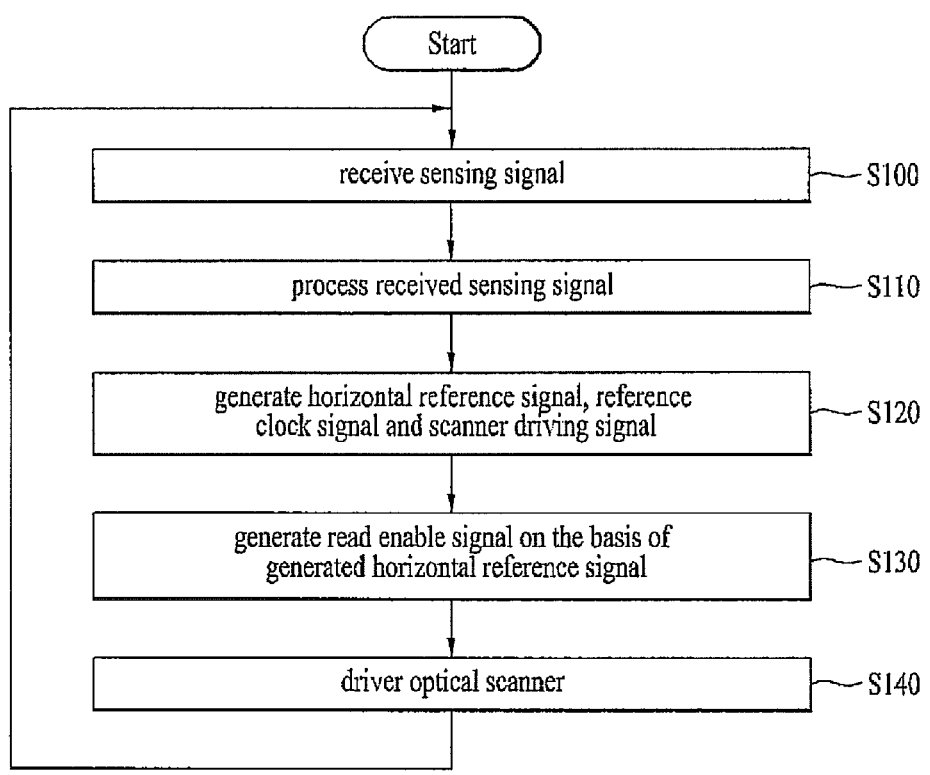
FIG. 10 is a flowchart illustrating a method for driving an optical scanner according to an exemplary embodiment of the present invention.

FIG. 10 is a flowchart illustrating a method for driving an optical scanner according to an exemplary embodiment of the present invention.

Referring to FIG. 10, when an initial scanner driving signal generated by the driving signal generator 210 is applied to the optical scanner 30, the optical scanner 30 starts to operate in response to the initial scanner driving signal to display an image on a screen. Here, the initial scanner driving signal may be generated on the basis of an initially set resonance frequency.

The optical scanner 30 outputs a sensing signal indicating sensing of operation of the optical scanner 30 (S100).

The sensing signal processor 220 processes the sensing signal output from the optical scanner 30. Here, the sensing signal processor 220 generates a horizontal scan signal on the basis of the sensing signal and outputs the generated horizontal scan signal to the driving signal generator 210.

The driving signal generator 210 generates a horizontal reference signal including line information that indicates the number of horizontal lines of the horizontal driving signal of the optical scanner, a reference clock signal and a feedback scanner driving signal on the basis of at least one of the horizontal scan signal output from the sensing signal processor 220 and a vertical frequency output from the video processor 10 (S120).

The driving signal generator 210 can output at least one of the generated horizontal reference signal and the reference clock signal to the adjustor 320.

In addition, the driving signal generator 210 applies the generated feedback scanner driving signal to the optical scanner.

The adjustor 320 generates a read enable signal on the basis of the horizontal reference signal output from the driving signal generator 210 (S130). Here, the adjustor 320 can output the generated read enable signal to the memory controller 310. The memory controller 310 controls output timing of video data to the laser driver 40 on the basis of the read enable signal output from the adjustor 320. The adjustor 320 may output the reference clock signal output from the driving signal generator 210 to the laser driver 40.

The optical scanner 30 operates according to the feedback scanner driving signal input thereto from the driving signal generator 210 (S140). The optical scanner 30 scans the number of horizontal lines, indicated by the line information included in the horizontal reference signal. The number of horizontal lines scanned by the optical scanner 30 may change. In an exemplary embodiment, the number of horizontal lines corresponding to a return period may vary while being maintained as an odd number.

According to the projector and the apparatus and method for driving an optical scanner thereof, the optical scanner is driven in synchronization with a vertical synchronization signal of video data, and thus an output vertical frequency corresponds to an input vertical frequency. Accordingly, it is possible to reduce memory capacity since a separate frame memory is not needed. Furthermore, the optical scanner can be prevented from being damaged because the horizontal frequency of the optical scanner is kept uniform. In addition, the number of horizontal lines of the optical scanner, which corresponds to a return period, is controlled to be maintained as one of an odd number and an even number, and thus a video frame can be displayed without being damaged.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A projector apparatus including an optical scanner for scanning an image on a screen, the projector apparatus comprising:
   an optical scanner;
   a video processor for receiving video data and a vertical synchronization signal of the video data; and
   a scanner driver for controlling a number of horizontal lines of a horizontal driving signal of the optical scanner to be varied based on the received vertical synchronization signal,
   wherein the scanner driver comprises:
      a sensing signal processor for receiving a sensing signal that represents sensing of operation of the optical scanner and for generating a horizontal scan signal corresponding to a horizontal frequency of the optical scanner based on the received sensing signal; and
      a driving signal generator for generating at least one of a horizontal reference signal including line information that indicates the number of horizontal lines of the horizontal driving signal of the optical scanner, a reference clock signal and a scanner driving signal for driving the optical scanner based on the generated horizontal scan signal,
   wherein the driving signal generator decreases the number of horizontal lines of a frame when a frequency of the horizontal scan signal is decreased, and
   the driving signal generator increases the number of horizontal lines of a frame when a frequency of the horizontal scan signal is increased,
   wherein when the frequency of the horizontal scan signal is varied, the total number of horizontal lines for a predetermined time is fixed and the number of horizontal lines only for each video frame is varied in the predetermined time, and
   wherein the number of horizontal lines varied is located in a blank period of the horizontal scan signal.

2. The projector apparatus according to claim 1, wherein the scanner driver generates a horizontal scan signal based on a sensing signal received from the optical scanner and generates the at least one of the horizontal reference signal including line information that indicates the number of horizontal lines of the horizontal driving signal of the optical scanner, the reference clock signal and the scanner driving signal for driving the optical scanner based on the generated horizontal scan signal.

3. The projector apparatus according to claim 1, wherein the video processor generates a read enable signal for controlling output timing of the received video data based on the horizontal reference signal.

4. The projector apparatus according to claim 3, further comprising a laser source for emitting a beam for displaying the video data; and
   a laser driver for generating a laser driving signal for driving the laser source based on the video data output according to the read enable signal and the generated reference clock signal.

5. The projector apparatus according to claim 3, wherein the video processor comprises:
   an adjustor for generating the read enable signal based on the generated horizontal reference signal; and
   a memory controller for controlling the video data to be output to the laser driver according to the read enable signal.

6. The projector apparatus according to claim 1, wherein the video processor includes a memory for storing received video frames, and the memory has a capacity of less than one video frame.

7. The projector apparatus according to claim 1, wherein the video processor buffers the video data as data having a size of less than one video frame.

8. The projector apparatus according to claim 1, wherein the scanner driver controls the total number of horizontal lines corresponding to a return period of the optical scanner to be maintained as any one of an odd number and an even number.

9. The projector apparatus according to claim 1, wherein the optical scanner scans the number of horizontal lines, indicated by the line information.

10. The projector apparatus according to claim 1, wherein the number of horizontal lines of the horizontal driving signal of the optical scanner varies.

11. The projector apparatus according to claim 1, further comprising an adjustor for generating a read enable signal for controlling output timing of received video data based on the generated horizontal reference signal.

12. The projector apparatus according to claim 1, wherein the sensing signal processor includes a differential amplifier for removing noise from the sensing signal.

13. The projector apparatus according to claim 1, wherein the driving signal generator includes a first memory for storing a horizontal synchronization signal and a second memory for storing a vertical synchronization signal, and the horizontal synchronization signal and the vertical synchronization signal are signals for driving the optical scanner.

14. The projector apparatus according to claim 1, wherein the driving signal generator comprises:
 a first digital-to-analog converter for converting the horizontal synchronization signal into an analog signal; and
 a second digital-to-analog converter for converting the vertical synchronization signal into an analog signal.

15. The projector apparatus according to claim 1, wherein the driving signal generator comprises:
 a first filter for filtering a high frequency component of the horizontal synchronization signal; and
 a second filter for filtering a high frequency component of the vertical synchronization signal.

16. A method for driving an optical scanner scanning an image on a screen, the method comprising:
 sensing operation of the optical scanner;
 generating a horizontal scan signal corresponding to a horizontal frequency of the optical scanner based on a sensing signal that represents sensing of operation of the optical scanner; and
 generating at least one of a horizontal reference signal including line information that indicates a number of horizontal lines of a horizontal driving signal of the optical scanner, a reference clock signal and a scanner driving signal for driving the optical scanner based on the generated horizontal scan signal,
 wherein the number of horizontal lines of a frame is decreased when a frequency of the horizontal scan signal is decreased, and
 the number of horizontal lines of a frame is increased when a frequency of the horizontal scan signal is increased,
 wherein when the frequency of the horizontal scan signal is varied, the total number of horizontal lines for a predetermined time is fixed and the number of horizontal lines only for each video frame is varied in the predetermined time, and
 wherein the number of horizontal lines varied is located in a blank period of the horizontal scan signal.

17. The method according to claim 16, further comprising generating a read enable signal for controlling output timing of video data based on the generated horizontal reference signal.

18. The method according to claim 16, wherein the generating of the horizontal scan signal comprises:
 removing noise from the sensing signal; and
 converting the noise-removed sensing signal into a clock signal.

19. The method according to claim 16, further comprising the optical scanner scanning the number of horizontal lines, indicated by the line information.

* * * * *